United States Patent
Lee et al.

(10) Patent No.: US 9,378,559 B2
(45) Date of Patent: Jun. 28, 2016

(54) SYSTEM AND METHOD FOR MOTION ESTIMATION

(71) Applicant: ELECTRONICS AND TELECOMMUNICATIONS RESEARCH INSTITUTE, Daejeon (KR)

(72) Inventors: So-Yeon Lee, Daejeon (KR); Sang-Joon Park, Daejeon (KR); Kyo-Il Chung, Daejeon (KR); Jae-Joon Yoo, Daejeon (KR); Jong-Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/592,300

(22) Filed: Jan. 8, 2015

(65) Prior Publication Data
US 2015/0279053 A1   Oct. 1, 2015

(30) Foreign Application Priority Data

Mar. 31, 2014   (KR) ......................... 10-2014-0038200

(51) Int. Cl.
*G06K 9/00*   (2006.01)
*G06T 7/20*   (2006.01)

(52) U.S. Cl.
CPC ............... *G06T 7/2093* (2013.01); *G06T 7/20* (2013.01); *G06T 2207/10012* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2005/0068454 A1* | 3/2005 | Afsenius | G06T 5/50 348/345 |
| 2005/0107916 A1* | 5/2005 | Nagasaka | B25D 57/032 700/245 |
| 2008/0031512 A1* | 2/2008 | Mundermann | G06K 9/00342 382/154 |
| 2009/0025483 A1* | 1/2009 | Connor | A61B 5/1126 73/849 |
| 2011/0148875 A1* | 6/2011 | Kim | G06T 13/40 345/420 |

FOREIGN PATENT DOCUMENTS

| | | |
|---|---|---|
| KR | 10-2009-0072435 | 7/2009 |
| KR | 10-2011-0070058 | 6/2011 |
| KR | 10-1080078 | 11/2011 |
| KR | 10-2013-0068191 | 6/2013 |

* cited by examiner

*Primary Examiner* — Nancy Bitar
(74) *Attorney, Agent, or Firm* — Kile Park Reed & Houtteman PLLC (57) ABSTRACT

A system and a method for motion estimation are disclosed. The system for motion estimation in accordance with an embodiment of the present invention includes: a plurality of motion sensors mounted near joints of a body and configured to provide motion information; a depth sensor configured to provide 3-dimensional image information having a 3-dimensional coordinate for each pixel; and a motion estimation device configured to estimate a motion by use of the motion information and the 3-dimensional image information, wherein the motion estimation device includes: a converging unit configured to compute mounting position information of the motion sensors by performing an initialization process by converging the motion information and the 3-dimensional image information; and an estimating unit configured to estimate the motion by computing a state vector including the mounting position information and the motion information.

12 Claims, 6 Drawing Sheets

SYSTEM AND METHOD FOR MOTION ESTIMATION

CROSS-REFERENCE TO RELATED APPLICATIONS

This application claims the benefit of Korean Patent Application No. 10-2014-0038200, filed with the Korean Intellectual Property Office on Mar. 31, 2014, the disclosure of which is incorporated herein by reference in its entirety.

BACKGROUND

1. Technical Field

The present invention relates to a system and a method for motion estimation.

2. Background Art

A variety of applications and services have been increasingly available through the use of image and motion sensors. In the field of defense, for example, the modern battlegrounds tend to be aimed for counter-terrorism, anti-piracy operations, hostage rescue operations, etc., requiring the soldiers to have a real battle-like training in a virtual space for the anticipated area of operations. For this, the United States and many other advanced European countries have actively developed and implemented virtual training systems, which are on the premise that postures and behaviors of participants and trainees are reflected in real time in virtual reality.

One of the drawbacks of the conventional virtual training systems is the incapability of estimating a precise posture and position of the participant. While various poses and behaviors are recognized to a certain degree through a motion sensor or an image sensor, the traveled distance and global location of the trainee have not been accurately estimated and displayed. In the case of a military training, this not only impairs the proper calculation of quantitative training results, such as accomplishment of travel distance requirement, measurement of the amount of activity, etc., which are presented in, for example, training manuals, but also eventually makes it difficult to undertake a real battle-like training when a comprehensive combat training is carried out.

The three-dimensional posture and position of a specific object or target in a space are mostly estimated using a camera image, infrared ray or a motion sensor.

As a recently-popular low-cost solution of using a camera image, the posture is estimated based on a depth map by estimating every joint point of a human body to draw a skeleton and extracting a rotation value of the joint point based on a difference between frames of the recognized depth map. However, since the extracted rotation value of the joint point is little accurate, it is inappropriate to apply this depth map-based posture estimation method to a virtual military training system, which requires a much higher precision, although it may be applied to a general game.

In the case of capturing a motion using a motion sensor only, it may be possible to estimate the posture of a trainee by use of motion information, such as acceleration and angular velocity, obtained through acceleration and angular velocity sensors, but errors of these sensors are divergently accumulated through time, making it inappropriate for a prolonged analysis.

SUMMARY

The present invention presents a system and a method for motion estimation that use image information with information of a motion sensor to allow a position, posture and traveled distance of a trainee to be accurately estimated in a virtual reality based training system.

An aspect of the present invention provides a system for motion estimation.

The system for motion estimation in accordance with an embodiment of the present invention includes: a plurality of motion sensors mounted near joints of a body and configured to provide motion information; a depth sensor configured to provide 3-dimensional image information having a 3-dimensional coordinate for each pixel; and a motion estimation device configured to estimate a motion by use of the motion information and the 3-dimensional image information, wherein the motion estimation device includes: a converging unit configured to compute mounting position information of the motion sensors by performing an initialization process by converging the motion information and the 3-dimensional image information; and an estimating unit configured to estimate the motion by computing a state vector including the mounting position information and the motion information.

In order to initialize position values of sensors that vary according to a body size of a trainee, the converging unit can be configured to have the body size of the trainee inputted thereto, generate a multi-view depth map by use of the 3-dimensional image information provided by the depth sensor, estimate joint points of the body of the trainee from the generated multi-view depth map, and then compute a 3-dimensional skeleton based on the inputted body size.

The converging unit can be configured to compute the mounting position information by mapping the mounting positions of the motion sensors to the 3-dimensional skeleton, and the 3-dimensional coordinate can be a coordinate having a z-axis value, which is a depth value, over a 2-dimensional coordinate of (x, y) plane, the depth value being a distance from the depth sensor to the trainee, and the mounting position information can be a 3-dimensional position vector of the motion sensors computed using the 3-dimensional coordinate.

The state vector can include the 3-dimensional position vector computed using the depth sensor and a velocity vector, an acceleration vector and quaternion computed from the motion information, and the estimating unit can be configured to compute a rotation and a position for each of x, y and z axes by use of the state vector.

The estimating unit can be configured to compute a step length value for each of the motion sensors and the depth sensor based on information observed through each of the motions sensors and the depth sensor, compute a traveled distance by accumulating the computed step length values, and compensate the traveled distance if a difference between the two step length values is greater than or equal to a predetermined critical value.

In case that the motion estimated using the motion information obtained from the motion sensors is determined to be a footstep, the estimating unit can be configured to compute a step length value for the depth sensor by extracting a footprint coordinate by use of the 3-dimensional image information obtained from the depth sensor at every detection point of the footstep, extracting a motion-based skeleton by use of the motion information, computing the step length value for the motion sensors by use of the extracted motion-based skeleton, and computing a footprint distance by use of the footprint coordinate.

The estimating unit can be configured to compensate the traveled distance by obtaining a compensated position coordinate per joint from a halfway point (i.e. ½) of a Euclidian distance between a position coordinate per joint extracted using a skeleton based on the motion sensors and a position coordinate per joint extracted using a skeleton based on the depth sensor and calculating a step length value from the compensated position coordinate per joint.

Another aspect of the present invention provides a method for estimating a motion by a motion estimating device connected with a depth sensor and motion sensors mounted near joints of a body.

The method for estimating a motion in accordance with an embodiment of the present invention includes: receiving motion information from the motion sensors; receiving 3-dimensional image information having a 3-dimensional coordinate for each pixel from the depth sensor; computing mounting position information of the motion sensors by performing an initialization process by converging the motion information and the 3-dimensional image information; and estimating the motion by computing a state vector including the mounting position information and the motion information.

The computing of the mounting position information of the motion sensors can include: having a body size of a trainee inputted; generating a multi-view depth map by use of the 3-dimensional image information provided by the depth sensor; and estimating a joint point of a body of the trainee from the multi-view depth map and then computing a 3-dimensional skeleton based on the inputted body size.

The computing of the mounting position information of the motion sensors can further include computing the mounting position information by mapping mounting positions of the motion sensors to the 3-dimensional skeleton. The 3-dimensional coordinate can be a coordinate having a z-axis value, which is a depth value, over a 2-dimensional coordinate of (x, y) plane, the depth value being a distance from the depth sensor to the trainee, and the mounting position information can be a 3-dimensional position vector of the motion sensors computed using the 3-dimensional coordinate.

The state vector can include the 3-dimensional position vector computed using the depth sensor and a velocity vector, an acceleration vector and quaternion computed from the motion information, and the estimating of the motion can include computing a rotation and a position for each of x, y and z axes by use of the state vector.

The estimating of the motion can include: computing a step length value for each of the motion sensors and the depth sensor based on information observed through each of the motions sensors and the depth sensor; computing a traveled distance by accumulating the computed step length values; and compensating the traveled distance if a difference between the two step length values is greater than or equal to a predetermined critical value.

The computing of the step length value for each of the motion sensors and the depth sensor can include: in case that the motion estimated using the motion information obtained from the motion sensors is determined to be a footstep, extracting a footprint coordinate by use of the 3-dimensional image information obtained from the depth sensor at every detection point of the footstep; extracting a motion-based skeleton by use of the motion information; computing the step length value for the motion sensors by use of the extracted motion-based skeleton; and computing the step length value for the depth sensor by computing a footprint distance by use of the footprint coordinate.

The compensating of the traveled distance can include: obtaining a compensated position coordinate per joint from a halfway point (i.e. ½) of a Euclidian distance between a position coordinate per joint extracted using a skeleton based on the motion sensors and a position coordinate per joint extracted using a skeleton based on the depth sensor; and calculating a step length value from the compensated position coordinate per joint.

With the present invention, the position, posture and traveled distance of the trainee can be accurately estimated by use of image information together with information of motion sensors in a virtual reality based training system.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain technology is determined to evade the point of the present invention, the pertinent detailed description will be omitted. Numerals (e.g., first, second, etc.) used in the description of the present invention are only for distinguishing one element from another element.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, some embodiments will be described in detail with reference to the accompanying drawings. Identical or corresponding elements will be given the same reference numerals, regardless of the figure number, and any redundant description of the identical or corresponding elements will not be repeated. Throughout the description of the present invention, when describing a certain technology is determined to evade the point of the present invention, the pertinent detailed description will be omitted.

Figure 1:
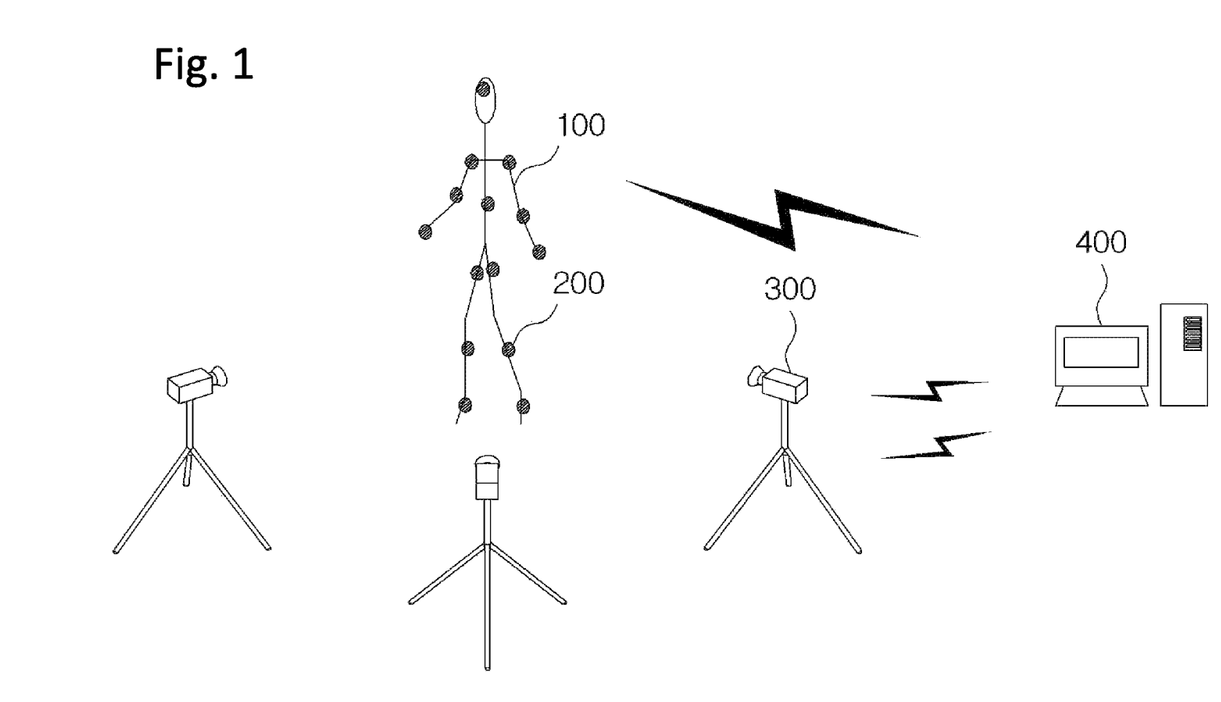
FIG. 1 and FIG. 2 are brief illustrations of the configuration of a system for motion estimation.
Figure 2:
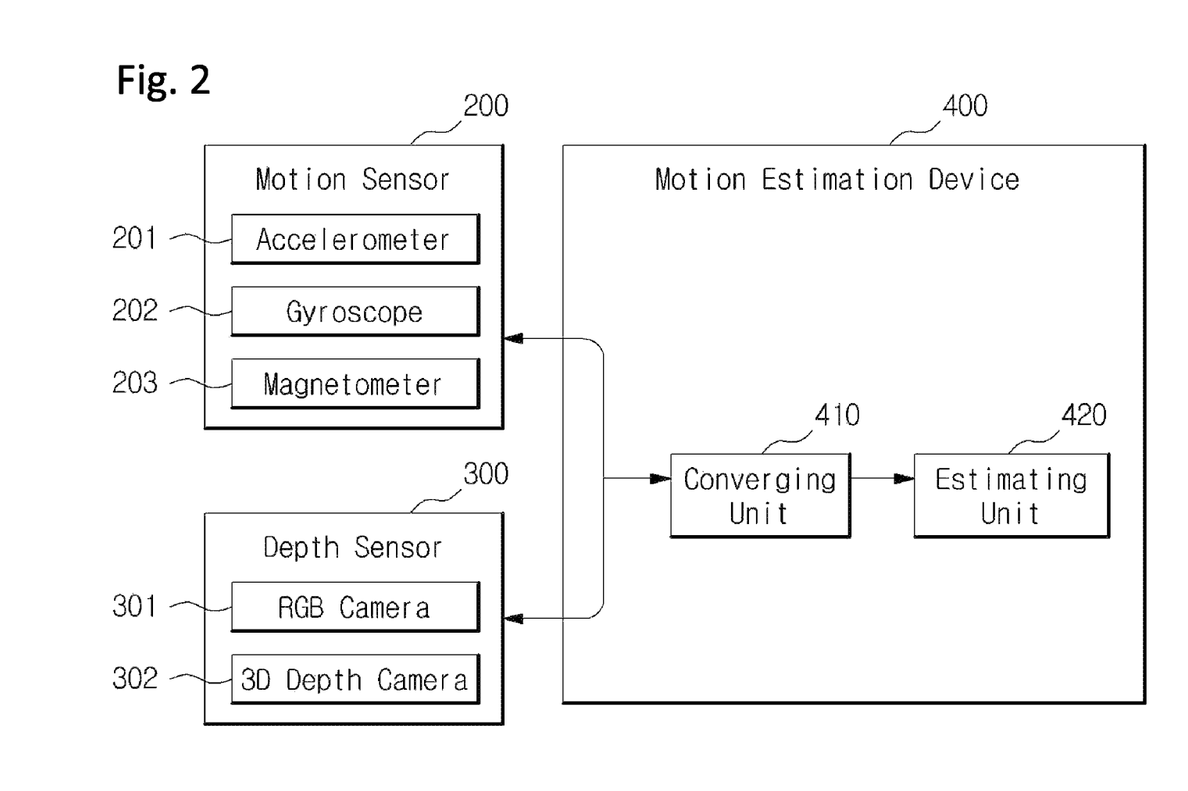

FIG. 1 and FIG. 2 are brief illustrations of the configuration of a system for motion estimation.

Referring to FIG. 1 and FIG. 2, the system for motion estimation includes a motion sensor 200, a depth sensor 300 and a motion estimation device 400.

A plurality of motion sensors 200 are mounted on a body of a trainee 100 to provide motion information. For example, the plurality of motion sensors 200 can be mounted near various joints of the body of the trainee 100. Referring to FIG. 2, each of the motion sensors 200 can include an accelerometer 201, a gyroscope 202 and a magnetometer 203 and can provide motion information of the joints of the trainee 100. Here, the motion information can include velocity, acceleration and quaternion.

The depth sensor 300 obtains 3-dimensional image information having a 3-dimensional coordinate for each pixel and provides the 3-dimensional image information of the trainee 100.

For example, referring to FIG. 2, the depth sensor 300 can include an RGB camera 301, which is a common general-purpose camera, and a 3-dimensional depth camera 302, and can obtain the 3-dimensional image information having a 3-dimensional coordinate for each pixel by use of a 2-dimensional image obtained through the RGB camera 301 and a depth value obtained through the 3-dimensional depth camera 302.

Moreover, it is also possible that the depth camera 300 is constituted with a plurality of RGB cameras 301 to obtain 3-dimensional image information. In such a case, the 3-dimensional image information can be obtained by combining 2-dimensional images obtained by the plurality of RGB cameras 301.

Moreover, the depth sensor 300 can be configured with an image sensor such as a TOF (time-of-flight) that obtains a 3-dimensional image by itself. Accordingly, in addition to an embodiment for obtaining 3-dimensional image information by arranging depth sensors 300, each of which including both an RGB camera 301 and a 3-dimensional depth camera 302, at various locations as illustrated in FIG. 1 and FIG. 2, an embodiment for obtaining 3-dimensional image information is also possible by disposing an image sensor for obtaining 3-dimensional image at a single location. Furthermore, an embodiment is also possible by having the depth sensor 300 not include the RGB camera 301 but include the 3-dimensional depth camera 302 only.

The motion estimation device 400 estimates a motion of the trainee 100 by use of the motion information and the 3-dimensional image information provided by the motion sensor 200 and the depth sensor 300.

Referring to FIG. 2, the motion estimation device 400 includes a converging unit 410 and an estimating unit 420.

Figure 3:
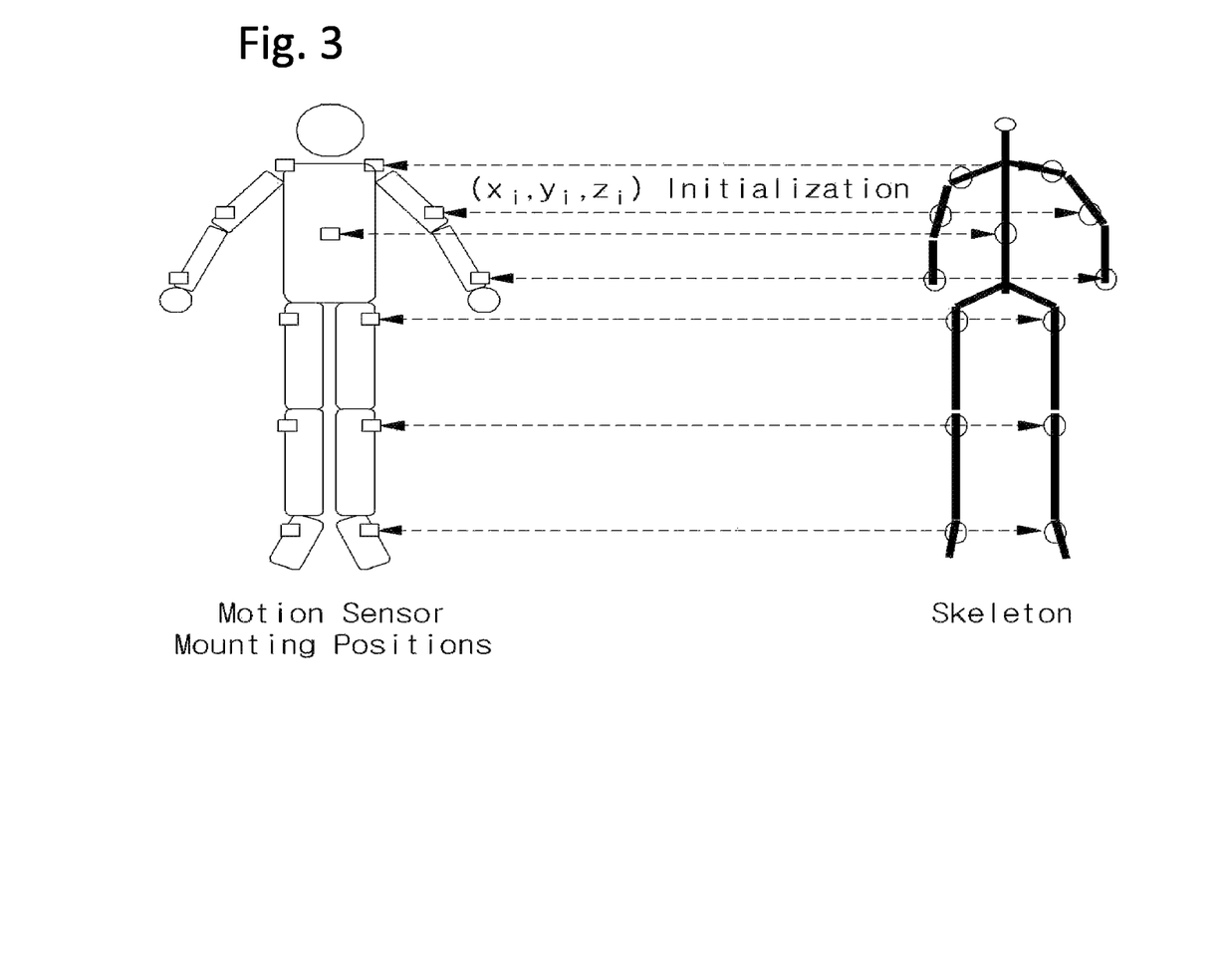
FIG. 3 is a conceptual diagram illustrating initialization of mounting position information of motion sensors.

The converging unit 410 converges the motion information and the 3-dimensional image information provided by the motion sensor 200 and the depth sensor 300 and performs an initialization procedure. Specifically, to initialize position values of sensors that change according to a body size of the trainee 100, the converging unit 410 has the body size of the trainee 100 inputted thereto, generates a multi-view depth map by use of the 3-dimensional image information provided by the depth sensor 300, estimates joint points of the body of the trainee 100 from the generated multi-view depth map, and then computes a 3-dimensional skeleton based on the inputted body size. Thereafter, the converging unit 410 maps mounting positions of the motion sensors 200 to the computed 3-dimensional skeleton, as illustrated in FIG. 3, which is a conceptual diagram showing initialization of mounting position information of the motion sensors. For example, the mounting position information, in which the mounting positions of the motions sensors 200 are mapped to the 3-dimensional skeleton, can be 3-dimensional position vectors of the motion sensors 200. Since the depth sensor 300 obtains a image having a 3-dimensional coordinate for each pixel, the converging unit 410 can configure a 3-dimensional position vector for each motion sensor 200. Here, the 3-dimensional coordinate can have a z-axis value, which is a depth value, i.e., a distance from a depth sensor 300 to the trainee 100, over a 2-dimensional coordinate of (x, y) plane.

Afterwards, the converging unit 410 sets the motion information provided by the motion sensors 200 to a predetermined initial value.

The estimating unit 420 estimates a motion by computing a state vector that includes the mounting position information and motion information of the motion sensors 200.

Figure 4:
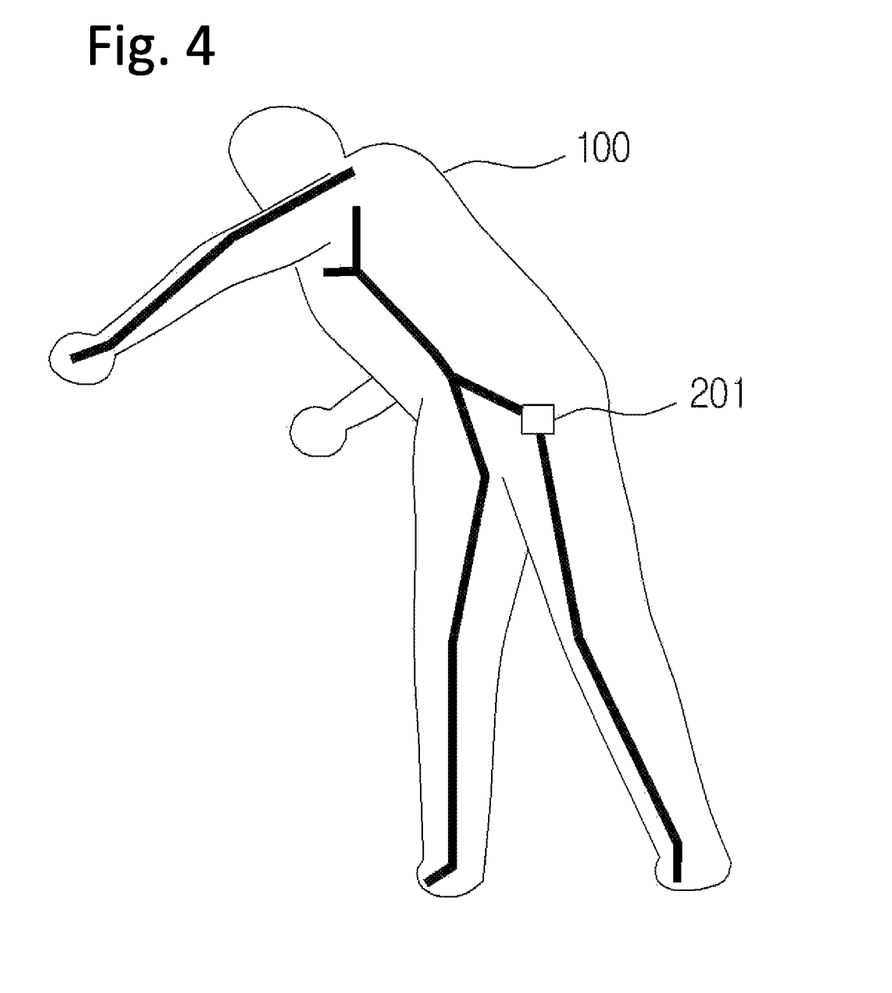
FIG. 4 shows an example of a mounting position of a motion sensor.
Figure 5:
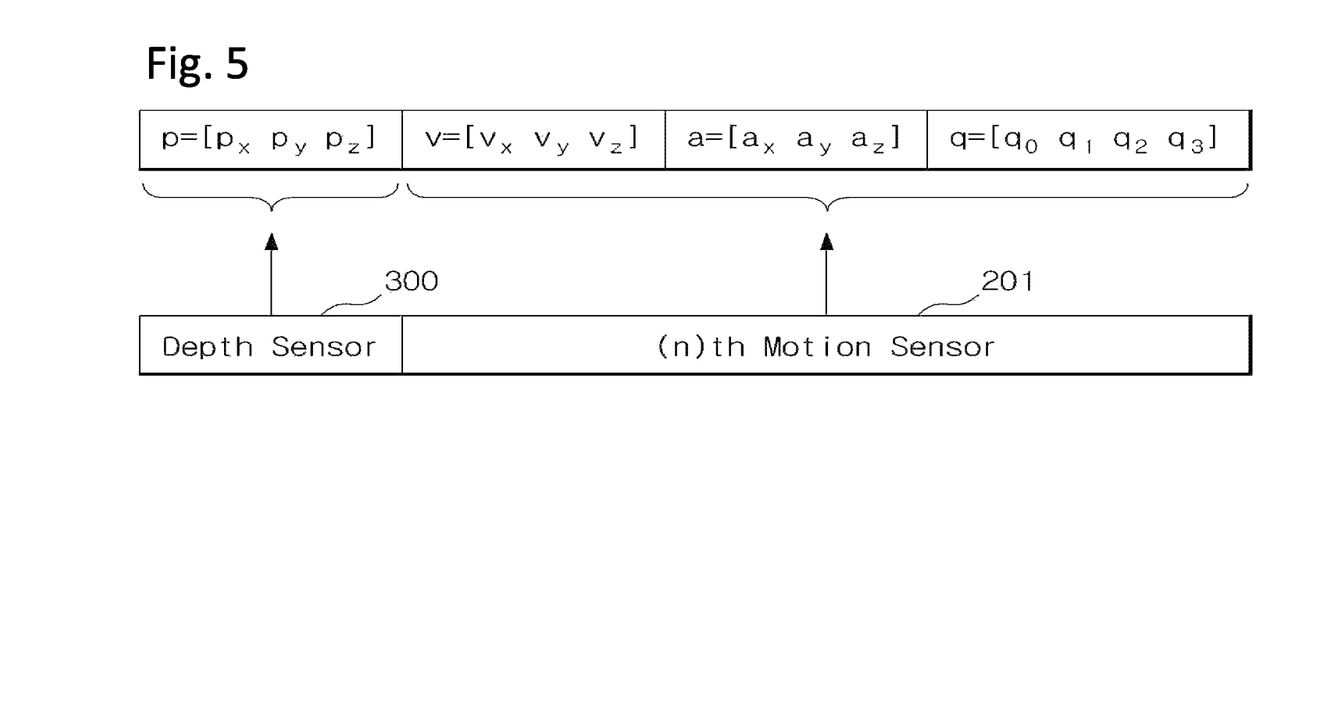
FIG. 5 shows a state vector for the motion sensor shown in FIG. 4.

For example, FIG. 4 shows an example of a mounting position of a motion sensor, and FIG. 5 shows the state vector for the motion sensor shown in FIG. 4. Referring to FIG. 4, the state vector including the mounting position information and motion information of a motion sensor 201 mounted on a leg joint can be expressed as follows.

| State vector of an (n)th motion sensor | $SS_n = [p\ v\ a\ q]$ |
| 3-dimensional position vector | $p = [p_x\ p_y\ p_z]$ |
| Velocity vector | $v = [v_x\ v_y\ v_z]$ |
| Acceleration vector | $a = [a_x\ a_y\ a_z]$ |
| Quaternion | $q = [q_0\ q_1\ q_2\ q_3]$ |

Pixel points corresponding to the mounting positions of the motion sensors 200 may be designated by an analyzer during the initialization or may be recognized from an RGB image that includes a marker image. Here, the marker can be a light-emitting device or a colored sticker that is attached to the body of the trainee 100.

The state vector described above can be configured as shown in FIG. 5. The estimating unit 420 can use the motion information, such as velocity, acceleration and quaternion, to compute a rotation and a position for each of x, y and z axes. As such, by obtaining the mounting position information of the motion sensors 200 mounted near the joints of the trainee 100 from the multi-view depth map and converging the obtained mounting position information and the motion information of pertinent positons, it becomes possible to recognize a posture and a position that are little affected by occlusion, which may be occurred when using image recognition only, and divergence of motion sensors.

Moreover, the estimating unit 420 computes a step length value for each of the motion sensors 200 and the depth sensors 300 based on information observed through each of the motions sensors 200 and the depth sensors 300 and computes a traveled distance by accumulating the computed step length values. Here, the estimating unit 420 compensates the traveled distance if the step length value for each of the motion sensors 200 and the depth sensors 300 is greater than or equal to a predetermined critical value.

For example, when a traveled distance of an object is estimated using the motion sensor 200, the accelerometer 201 and the gyroscope 202 are typically used at the same time. Specifically, after setting a position of a starting point, a measurer can measure a current direction by use of the gyroscope 202 and measures an acceleration value by use of the accelerometer 201 and can compute the traveled distance by performing an integration operation of the measured direction and acceleration value twice. In other words, once the direction and distance from the starting point are obtained, a current position of the object can be computed using the obtained direction and distance. However, in this specification, the trainee 100 moves in a limited space, and thus applying a conventional method is likely to result in exceeding a range of tolerance. Therefore, the estimating unit 420 compensates the traveled distance of the trainee 100 by use of two step length values computed, respectively, for the motion sensor 200 and the depth sensor 300.

For example, in case that the motion estimated using the motion information obtained from the motion sensors 200 is determined to be a footstep, the estimating unit 420 extracts a footprint coordinate by use of 3-dimensional image information obtained from the depth sensors 300 at every detection point of the footstep.

Then, the estimating unit 420 extracts a motion-based skeleton, and computes a step length value of the trainee 100 based on the information observed through the motion sensors 200 by use of the extracted motion-based skeleton. Specifically, by measuring and initializing the distances between every joint point and an observation position by use of the plurality of motion sensors 200 mounted on the full body of the trainee 100, the estimating unit 420 can model the motion of the trainee 100 as a rigid body using a global coordinate value and Euler rotation matrix. Moreover, the estimating unit 420 can estimate the step length of the trainee 100 by calculating a distance between two feet as a relative length by use of the extracted motion-based skeleton.

By calculating the distance between two footprints by use of the extracted footprint coordinate, the estimating unit 420 computes the step length values of the trainee 100 based on the information observed through the depth sensor 300. Moreover, if the difference between two step length values for each of the motion sensors 200 and the depth sensors 300 is smaller than a predetermined critical value, the estimating unit 420 can accumulate the step length values to compute the traveled distance of the trainee 100. If, on the other hand, the difference between two step length values for each of the motion sensors 200 and the depth sensors 300 is greater than or equal to the predetermined critical value, the estimating unit 420 compensates the traveled distance. That is, the estimating unit 420 can compensate the traveled distance by obtaining a compensated position coordinate per joint from a halfway point (i.e. ½) of a Euclidian distance between a position coordinate per joint (or per observation position) extracted using the skeleton based on the motion sensor 200 and a position coordinate per joint (or per observation position) extracted using the skeleton based on the depth sensor 300 and calculating the step length value from the compensated position coordinate per joint.

Figure 6:
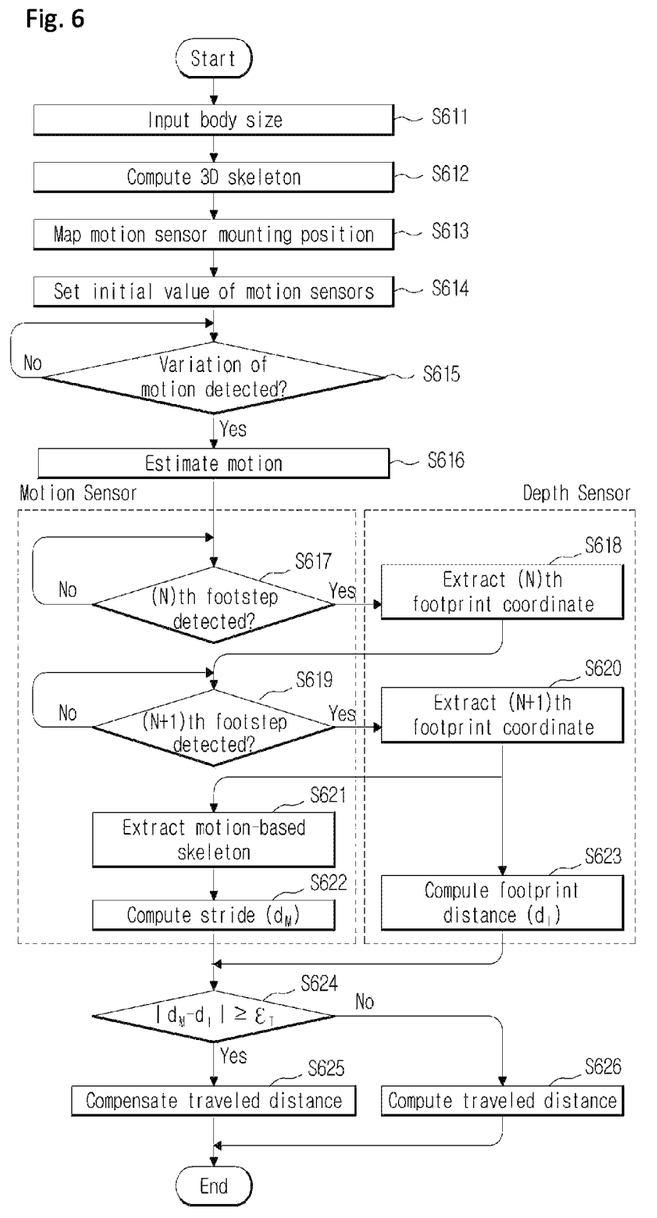
FIG. 6 is a flow diagram showing a method for motion estimation carried out in the system for motion estimation.

FIG. 6 is a flow diagram showing a method for motion estimation carried out in the system for motion estimation.

In step S611, the motion estimation device 400 has a body size of a trainee 100 inputted thereto in order to initialize position values of sensors that vary according to the body size of the trainee 100.

In step S612, the motion estimation device 400 computes a 3-dimensional skeleton based on the inputted body size. For instance, the motion estimation device 400 can generate a multi-view depth map by use of 3-dimensional image information provided by the depth sensor 300 and compute the 3-dimensional skeleton by estimating joint points of the body of the trainee 100 from the generated multi-view depth map.

In step S613, the motion estimation device 400 maps mounting positions of the motion sensors 200 to the computed 3-dimensional skeleton. For example, mounting position information, in which the mounting positions of the motions sensors 200 are mapped to the 3-dimensional skeleton, can be 3-dimensional position vectors of the motion sensors 200.

In step S614, the motion estimation device 400 sets motion information provided by the motion sensors 200 to a predetermined initial value In step S615, the motion estimation device 400 determines whether any variation of motion is detected through the motion sensors 200.

In step S616, the motion estimation device 400 estimates the motion if a variation of motion is detected. That is, the motion estimation device 400 estimates the motion by computing a state vector that includes the mounting position information and the motion information of the motion sensors 200. For example, the motion estimation device 400 can use the motion information, such as velocity, acceleration and quaternion, to compute a rotation and a position for each of x, y and z axes.

In step S617, the motion estimation device 400 determines whether the motion estimated using the motion information obtained from the motion sensors 200 is an (N)th footstep.

In step S618, in case the detected motion is the (N)th footstep, the motion estimation device 400 extracts an (N)th footprint coordinate by use of the 3-dimensional image information obtained from the depth sensor 300 at this point.

In step S619, the motion estimation device 400 determines whether the motion estimated using the motion information obtained from the motion sensors 200 is an (N+1)th footstep.

In step S620, in case the detected motion is the (N+1)th footstep, the motion estimation device 400 extracts an (N+1)th footprint coordinate by use of the 3-dimensional image information obtained from the depth sensor 300 at this point.

In step S621, the motion estimation device 400 extracts a motion-based skeleton by use of the motion information.

In step S622, the motion estimation device 400 computes a step length value ($d_M$) of the trainee 100 based on the information observed through the motion sensors 200 by use of the extracted motion-based skeleton. For example, by measuring and initializing the distances between every joint point and an observation position by use of the plurality of motion sensors 200 mounted on the full body of the trainee 100, the motion estimation device 400 can model the motion of the trainee 100 as a rigid body using a global coordinate value and Euler rotation matrix. Moreover, the motion estimation device 400 can estimate the step length of the trainee 100 by calculating a distance between two feet as a relative length by use of the extracted motion-based skeleton.

In step S623, the motion estimation device 400 computes a step length value ($d_I$) of the trainee 100 based on the information observed through the depth sensor 300. That is, the motion estimation device 400 can compute a distance between two footprints by use of the (N)th footprint coordinate and the (N+1)th footprint coordinate.

In step S624, the motion estimation device 400 determines whether a difference between the step length value ($d_M$) of the trainee 100 based on the information observed through the motion sensors 200 and the step length value ($d_I$) of the trainee 100 based on the information observed through the depth sensor 300 is greater than or equal to a predetermined critical value ($\epsilon_T$).

In step S625, if it is determined that the difference between the two step length values ($d_M$ and $d_I$) is greater than or equal to the predetermined critical value, the motion estimation device 400 compensates a traveled distance. That is, the motion estimation device 400 can compensate the traveled distance by obtaining a compensated position coordinate per joint from a halfway point (i.e. ½) of a Euclidian distance between a position coordinate per joint (or per observation position) extracted using the skeleton based on the motion sensor 200 and a position coordinate per joint (or per observation position) extracted using the skeleton based on the depth sensor 300 and calculating the step length value from the compensated position coordinate per joint.

In step S626, the motion estimation device 400 computes the traveled distance of the trainee 100 by accumulating the step length values if the difference between the two step length values ($d_M$ and $d_I$) is smaller than the predetermined critical value.

The method for motion estimation according to an embodiment of the present invention may be implemented as a form of program instructions executable through various means for electronically processing information and written in a storage medium, which may include program instructions, data files, data structures or any combination thereof.

The program instructions stored in the storage medium can be designed and configured specifically for the present invention or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of the present invention, and the opposite is also possible.

While the present invention has been described with reference to certain embodiments, the embodiments are for illustrative purposes only and shall not limit the invention. It is to be appreciated that those skilled in the art can change or modify the embodiments without departing from the scope and spirit of the invention.

What is claimed is:

1. A system for motion estimation, comprising:
a plurality of motion sensors mounted near joints of a body and configured to provide motion information;
a depth sensor configured to provide 3-dimensional image information having a 3-dimensional coordinate for each pixel; and
a motion estimation device configured to estimate a motion by use of the motion information and the 3-dimensional image information,
wherein the motion estimation device comprises:
a converging unit configured to compute mounting position information of the motion sensors by performing an initialization process by converging the motion information and the 3-dimensional image information; and
an estimating unit configured to estimate the motion by computing a state vector including the mounting position information and the motion information,
wherein the estimating unit is configured to compute a step length value for each of the motion sensors and the depth sensor based on information observed through each of the motions sensors and the depth sensor, compute a traveled distance by accumulating the computed step length values, and compensate the traveled distance if a difference between the two step length values is greater than or equal to a predetermined critical value.

2. The system of claim 1, wherein, in order to initialize position values of sensors that vary according to a body size of a trainee, the converging unit is configured to have the body size of the trainee inputted thereto, generate a multi-view depth map by use of the 3-dimensional image information provided by the depth sensor, estimate joint points of the body of the trainee from the generated multi-view depth map, and then compute a 3-dimensional skeleton based on the inputted body size.

3. The system of claim 2, wherein the converging unit is configured to compute the mounting position information by mapping the mounting positions of the motion sensors to the 3-dimensional skeleton,
wherein the 3-dimensional coordinate is a coordinate having a z-axis value, which is a depth value, over a 2-dimensional coordinate of (x, y) plane, the depth value being a distance from the depth sensor to the trainee, and
wherein the mounting position information is a 3-dimensional position vector of the motion sensors computed using the 3-dimensional coordinate.

4. The system of claim 3, wherein the state vector comprises the 3-dimensional position vector computed using the depth sensor and a velocity vector, an acceleration vector and quaternion computed from the motion information, and
wherein the estimating unit is configured to compute a rotation and a position for each of x, y and z axes by use of the state vector.

5. The system of claim 1, wherein, in case that the motion estimated using the motion information obtained from the motion sensors is determined to be a footstep, the estimating unit is configured to compute a step length value for the depth sensor by extracting a footprint coordinate by use of the 3-dimensional image information obtained from the depth sensor at every detection point of the footstep, extracting a motion-based skeleton by use of the motion information, computing the step length value for the motion sensors by use of the extracted motion-based skeleton, and computing a footprint distance by use of the footprint coordinate.

6. The system of claim 1, wherein the estimating unit is configured to compensate the traveled distance by obtaining a compensated position coordinate per joint from a halfway point (i.e. ½) of a Euclidian distance between a position coordinate per joint extracted using a skeleton based on the motion sensors and a position coordinate per joint extracted using a skeleton based on the depth sensor and calculating a step length value from the compensated position coordinate per joint.

7. A method for estimating a motion, the motion being estimated by a motion estimating device connected with a depth sensor and motion sensors mounted near joints of a body, the method comprising:
receiving motion information from the motion sensors;
receiving 3-dimensional image information having a 3-dimensional coordinate for each pixel from the depth sensor;
computing mounting position information of the motion sensors by performing an initialization process by converging the motion information and the 3-dimensional image information; and
estimating the motion by computing a state vector including the mounting position information and the motion information,
wherein the estimating of the motion comprises:
computing a step length value for each of the motion sensors and the depth sensor based on information observed through each of the motions sensors and the depth sensor;
computing a traveled distance by accumulating the computed step length values; and
compensating the traveled distance if a difference between the two step length values is greater than or equal to a predetermined critical value.

8. The method of claim 7, wherein the computing of the mounting position information of the motion sensors comprises:
- having a body size of a trainee inputted;
- generating a multi-view depth map by use of the 3-dimensional image information provided by the depth sensor; and
- estimating a joint point of a body of the trainee from the multi-view depth map and then computing a 3-dimensional skeleton based on the inputted body size.

9. The method of claim 8, wherein the computing of the mounting position information of the motion sensors further comprises computing the mounting position information by mapping mounting positions of the motion sensors to the 3-dimensional skeleton,
- wherein the 3-dimensional coordinate is a coordinate having a z-axis value, which is a depth value, over a 2-dimensional coordinate of (x, y) plane, the depth value being a distance from the depth sensor to the trainee, and
- wherein the mounting position information is a 3-dimensional position vector of the motion sensors computed using the 3-dimensional coordinate.

10. The method of claim 9, wherein the state vector comprises the 3-dimensional position vector computed using the depth sensor and a velocity vector, an acceleration vector and quaternion computed from the motion information, and
- wherein the estimating of the motion comprises computing a rotation and a position for each of x, y and z axes by use of the state vector.

11. The method of claim 7, wherein the computing of the step length value for each of the motion sensors and the depth sensor comprises:
- in case that the motion estimated using the motion information obtained from the motion sensors is determined to be a footstep, extracting a footprint coordinate by use of the 3-dimensional image information obtained from the depth sensor at every detection point of the footstep;
- extracting a motion-based skeleton by use of the motion information;
- computing the step length value for the motion sensors by use of the extracted motion-based skeleton; and
- computing the step length value for the depth sensor by computing a footprint distance by use of the footprint coordinate.

12. The method of claim 7, wherein the compensating of the traveled distance comprises:
- obtaining a compensated position coordinate per joint from a halfway point (i.e. ½) of a Euclidian distance between a position coordinate per joint extracted using a skeleton based on the motion sensors and a position coordinate per joint extracted using a skeleton based on the depth sensor; and
- calculating a step length value from the compensated position coordinate per joint.

* * * * *